United States Patent
Intoppa et al.

(10) Patent No.: US 10,386,997 B2
(45) Date of Patent: Aug. 20, 2019

(54) INTEGRATING FUNCTIONS FOR A USER INPUT DEVICE

(71) Applicant: SAP SE, Walldorf (DE)

(72) Inventors: Daniel Intoppa, Karlsruhe (DE); Eduard Hess, Wiesloch (DE)

(73) Assignee: SAP SE, Walldorf (DE)

( * ) Notice: Subject to any disclaimer, the term of this patent is extended or adjusted under 35 U.S.C. 154(b) by 313 days.

(21) Appl. No.: 14/921,249

(22) Filed: Oct. 23, 2015

(65) Prior Publication Data

US 2017/0115830 A1   Apr. 27, 2017

(51) Int. Cl.
| | |
|---|---|
| G06F 3/0482 | (2013.01) |
| G06F 3/0484 | (2013.01) |
| G06F 3/0486 | (2013.01) |
| G06F 3/0488 | (2013.01) |

(52) U.S. Cl.
CPC .......... G06F 3/0482 (2013.01); G06F 3/0486 (2013.01); G06F 3/0488 (2013.01); G06F 3/04842 (2013.01); G06F 2203/04806 (2013.01)

(58) Field of Classification Search
CPC ................. G06F 3/0482; G06F 3/0486; G06F 2203/04806; G06F 3/04842
See application file for complete search history.

(56) References Cited

U.S. PATENT DOCUMENTS

| | | | |
|---|---|---|---|
| 8,176,096 B2 | 5/2012 | Allyn et al. | |
| 9,443,501 B1* | 9/2016 | Adam | ...................... G10H 1/18 |
| 9,582,187 B2* | 2/2017 | Gil | ........................ G06F 3/0482 |
| 2002/0149605 A1* | 10/2002 | Grossman | ............. G06F 3/0485 |
| | | | 345/660 |
| 2006/0265653 A1* | 11/2006 | Paasonen | .............. G06F 3/0485 |
| | | | 715/704 |
| 2007/0024646 A1 | 2/2007 | Saarinen et al. | |
| 2008/0297482 A1* | 12/2008 | Weiss | .................. G06F 3/04883 |
| | | | 345/173 |
| 2009/0009535 A1* | 1/2009 | Iwamoto | .............. G01C 21/367 |
| | | | 345/666 |
| 2010/0283750 A1* | 11/2010 | Kang | .................... G06F 3/0416 |
| | | | 345/173 |
| 2010/0296806 A1* | 11/2010 | Seo | ........................ G03B 7/003 |
| | | | 396/236 |
| 2012/0056836 A1* | 3/2012 | Cha | ...................... G06F 3/04842 |
| | | | 345/173 |

(Continued)

OTHER PUBLICATIONS

Internet article entitled "MSChart Extension—Zoom and Pan Control", retrieved from: http://www.codeproject.com/Articles/357817/MSChart-Extension-Zoom-and-Pan-Control, Jul. 19, 2012.

*Primary Examiner* — Shen Shiau
(74) *Attorney, Agent, or Firm* — Fountainhead Law Group P.C.

(57) ABSTRACT

The embodiments described herein relate to an improved technique for integrating zoom, pan and select functions for a user input device in a data processing system. The described novel selection pattern allows for relying on user input device actions and a context menu to integrate multiple functions for a user input device to reduce significantly the travel required for the user input device. In one embodiment, the systems and methods integrate zoom, pan and select functions for a user input device that are applicable to many different data processing device types and sizes.

15 Claims, 16 Drawing Sheets

(56) References Cited

U.S. PATENT DOCUMENTS

| | | | |
|---|---|---|---|
| 2012/0204101 A1* | 8/2012 | Yoshida | G06F 3/0484 |
| | | | 715/246 |
| 2013/0019174 A1* | 1/2013 | Gil | G06F 3/04812 |
| | | | 715/711 |
| 2013/0019182 A1* | 1/2013 | Gil | G06F 3/0482 |
| | | | 715/738 |
| 2014/0019892 A1 | 1/2014 | Mayerhofer | |
| 2014/0040009 A1* | 2/2014 | Shi | G06Q 30/0242 |
| | | | 705/14.42 |
| 2014/0109004 A1* | 4/2014 | Sadhvani | G06F 3/0482 |
| | | | 715/810 |
| 2014/0337778 A1 | 11/2014 | Armitage | |
| 2015/0058808 A1* | 2/2015 | John | G06F 3/04842 |
| | | | 715/835 |
| 2015/0338942 A1* | 11/2015 | Stone | G06F 3/0488 |
| | | | 345/173 |
| 2016/0299588 A1* | 10/2016 | Ainalem | G06F 3/0488 |
| 2018/0329611 A1* | 11/2018 | Huang | G06F 3/04842 |

\* cited by examiner

Function Menu 200

| Mouse | Mouse Event | Mobile Event | Function |
|---|---|---|---|
| 205 | MouseUp | touchend | |
| 206 | MouseDown | touchstart | |
| 207 | MouseMove | touchmove | |
| 208 ⬜ + 👆 = 🔍 | Click | Click | Start/End Selection |
| 209 ⬥ + 👆 = ✥ | Drag | Drag | Pan |
| 210 🔍 + 👆 = ⓐ | DoubleClick | DoubleClick | Select All |

FIG. 2

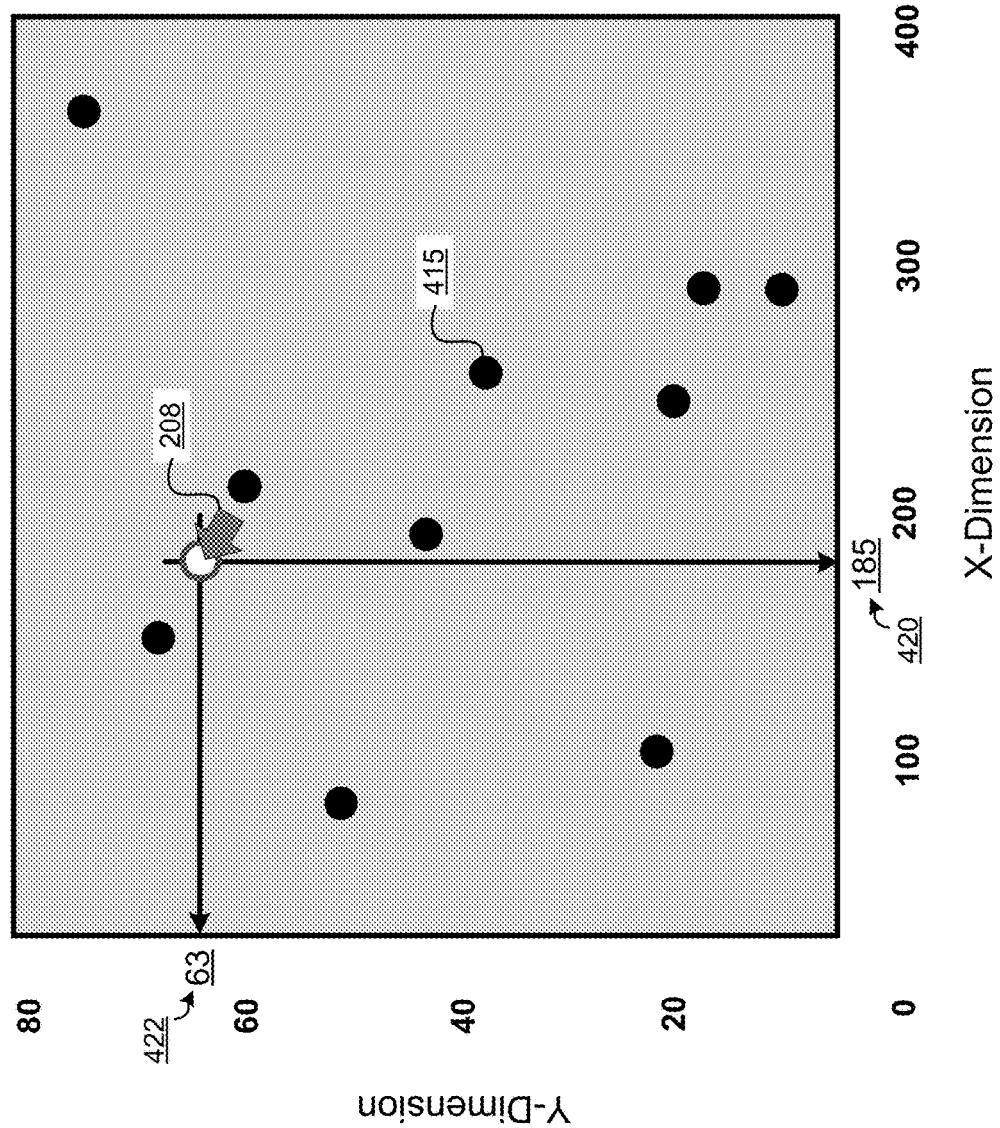

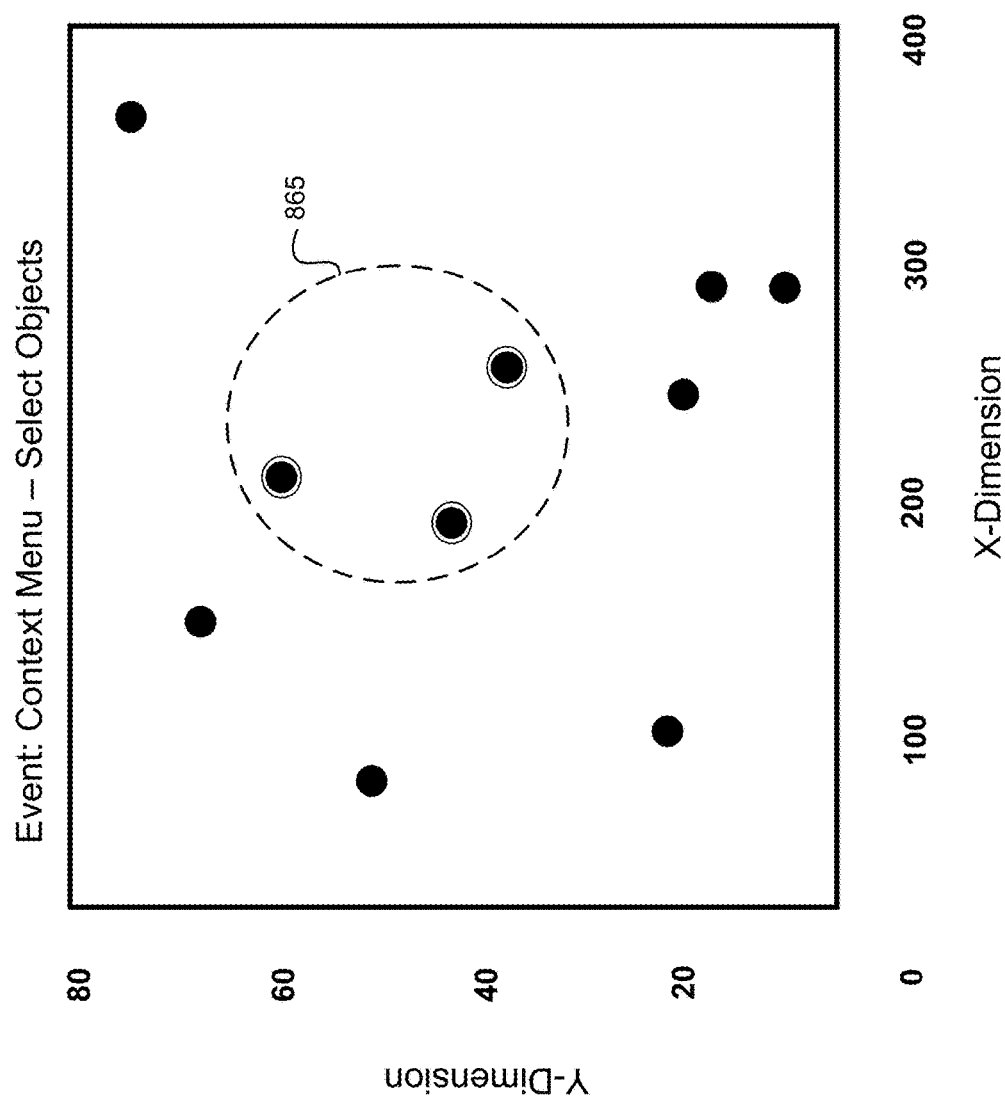

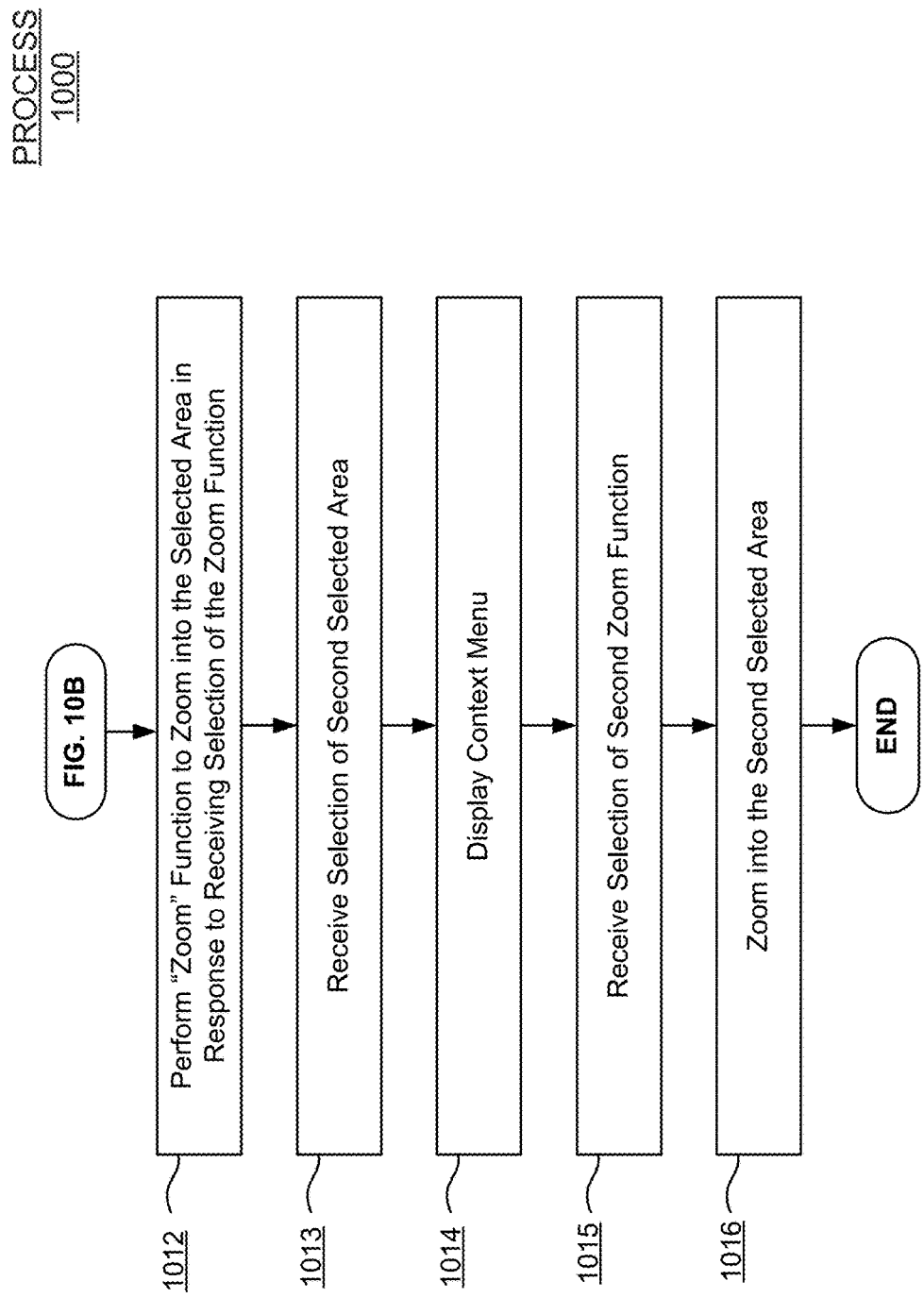

INTEGRATING FUNCTIONS FOR A USER INPUT DEVICE

FIELD OF THE INVENTION

At least certain embodiments disclosed herein relate generally to an improved user input device for computer systems, and more particularly to a computer-implemented system and method for integrating zoom, pan and select functions for a user input device.

BACKGROUND

User input devices for data processing systems are well-known and include various devices such as a mouse, keyboard, touch screen, etc. The term "click" is commonly used to refer to the action of pressing a mouse button (usually the left mouse button if the mouse has two buttons) or actuating other user input devices one or more times. For example, a click can also refer to user actions on a touch screen including a touch start action (finger down) and a touch end action (finger up). The actions performed when clicking a user input device depend on the particular computer or software program being used. Below are general ways to "click" a user input device and the corresponding actions performed.

A "single-click" often refers to pressing and releasing the button of a user input device (or finger down followed by finger up on a touch screen device) to perform various actions. A user can click on a particular on-screen button, menu, tool bar tab, icon, file menu, or other object in a graphical display, etc. For a mouse with two or more buttons, a single-click typically defaults to the left mouse button, which may also be referred to as "left-clicking" the mouse.

A "right-click" often refers to pressing an alternate mouse button (often the right one) to perform special actions or to bring up a selection menu with additional action options. For example, right-clicking a mouse button may bring up a menu with additional options relating to the particular object that was selected with the right-click. A "middle-click" often refers to pressing the middle button of a three-button user input device (such as a three-button mouse or using a mouse wheel as a third button) to perform pre-programmed options that can be configured through the user input device settings or a software program.

"Click-and-drag" often refers to pressing and holding the button of the user input device (or touching down and moving one's finger in the display screen of a touch screen device) while moving from one location to another. Click-and-drag, or for simplicity, "drag" operations can be used to highlight or select text (drag-select) or to select one or more objects. A "double-click" often refers to pressing a button of the user input device (or finger down on a touch screen device) two times in rapid succession. Typically a double-click user input can be used to open or execute files or programs, etc.

Zooming, panning and selecting are common user input functions available for dealing with large amounts of data in a graphical display. For example, many computer-aided design (CAD) programs, text processing software, and interactive charts include voluminous amounts of information that may not be easy for users to observe without the ability to zoom in/out, pan, and select objects at different locations within a file or program, or at different levels of granularity. To solve these issues, such programs offer the possibility to select and manipulate objects, and also enable users to zoom in/out of the graphical display.

However many such applications configured to display large amounts of information in a graphical display screen rely on additional menus, toolbars, and/or buttons to offer such functions. Relying on such menus, toolbars, and buttons is cumbersome and requires a significant amount of actions and movements to be taking with the user input device to initiate the desired functions. Moreover, for data processing devices that do not have access to a mouse, such as a laptop computer or a device having a touch screen, it is often challenging for users to zoom, pan, and select objects in the graphical display of these devices.

SUMMARY

The embodiments described herein relate to an improved system and method for integrating zoom, pan and select functions for a user input device. In one embodiment a method is disclosed comprising receiving an indication of a first click from the user input device at a first location in a graphical display, receiving an indication of a second click from the user input device at a second location in the graphical display where the first location and the second location define a selected area in the graphical display, displaying a graphical representation of the selected area in the graphical display, displaying a context menu in the graphical display upon selection of the selected area where the context menu includes at least a zoom function and a select function, receiving in the context menu an indication of a third click from the user input device that selects either the zoom function or the select function, and performing the selected zoom function or select function upon receiving the third click. The method further comprises receiving an indication of a drag operation from the user input device and performing a pan function in response to the drag operation to enable users to pan around in the graphical display.

The select function is operable to select individual objects or a range of objects within the selected area of the graphical display, the zoom function is operable to zoom into the selected area of the graphical display, and the pan function is operable to pan around in the graphical display. The zoom and select functions are provided in a single context menu and embodiments are configured to toggle between the zoom function and the select function using the context menu. The pan function is integrated as a drag operation for the user input device.

In another embodiment a system for integrating zoom, pan and select functions for a user input device is disclosed. The system comprises a processor and a system memory in communication with the processor via a communication medium. The system memory can be configured to store computer code, which when executed by the processor, causes the processor to perform operations comprising receiving an indication of a first click from the user input device at a first location in a graphical display, receiving an indication of a second click from the user input device at a second location in the graphical display where the first location and the second location define a selected area in the graphical display, displaying a graphical representation of the selected area in the graphical display, displaying a context menu in the graphical display upon selection of the selected area where the context menu includes at least a zoom function and a select function, receiving in the context menu an indication of a third click from the user input device that selects one of the zoom function or the select function, and performing the selected zoom function or select function upon receiving the third click. The operations further comprise receiving an indication of a drag operation from the user input device and performing a pan function in response to the drag operation.

The select function is operable to select individual objects or a range of objects within the selected area of the graphical display, the zoom function is operable to zoom into the selected area of the graphical display, and the pan function is operable to pan around within the graphical display. The zoom and select functions are provided in a single context menu and a single user input device action can toggle between the zoom function and the select function.

In yet other embodiments a computer readable medium for performing operations for integrating zoom and select functions for a user input device is disclosed. The operations comprise receiving an indication of a first click from the user input device at a first location in a graphical display, receiving an indication of a second click from the user input device at a second location in the graphical display where the first location and the second location define a selected area in the graphical display, displaying a graphical representation of the selected area in the graphical display, displaying a context menu in the graphical display upon selection of the selected area where the context menu includes at least a zoom function and a select function, receiving in the context menu an indication of a third click from the user input device that selects one of the zoom function or the select function, and performing the selected zoom function or select function upon receiving the third click. The operations further comprise receiving an indication of a drag operation from the user input device and performing a pan function in response to the drag operation.

The following detailed description and accompanying drawings provide a better understanding of the nature and advantages of the present invention.

BRIEF DESCRIPTION OF THE DRAWINGS

For a better understanding of at least certain embodiments, reference will be made to the following detailed description, which is to be read in conjunction with the accompanying drawings.

FIG. 2 depicts an example function menu listing functions to be implemented with the embodiments described herein.

FIG. 4 depicts an example representation of starting an area selection in a graphical display according to the techniques described herein.

FIG. 9A depicts an example representation of selected objects in a graphical display according to the techniques described herein.

FIG. 10A-10C depict example flow charts of an embodiment of a process for integrating zoom, pan and select functions for a user input device according to the techniques described herein.

DETAILED DESCRIPTION

Figure 1:
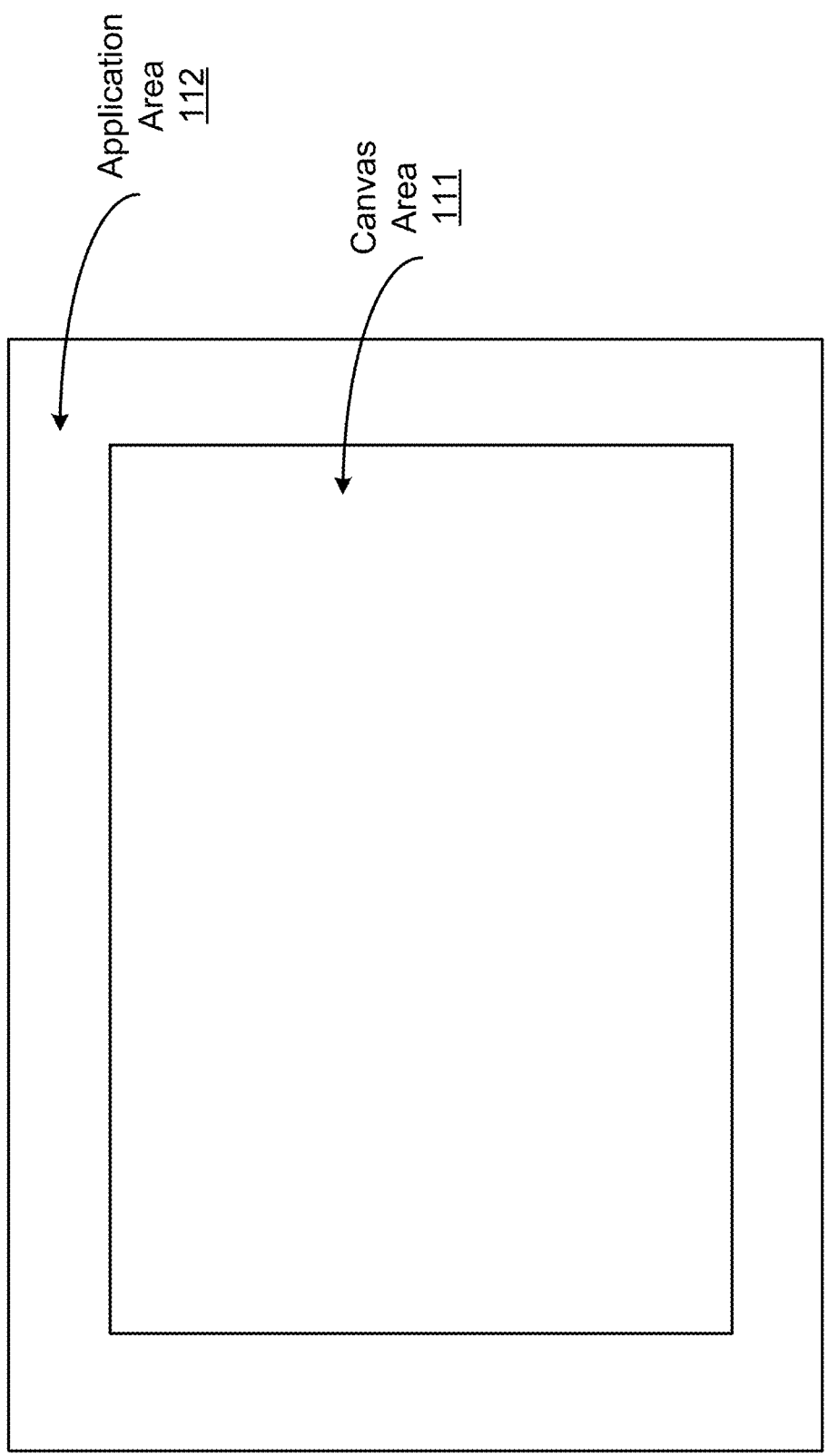
FIG. 1 depicts an example graphical display having a canvas area and an application area.

Throughout the description, for the purposes of explanation, numerous specific details are set forth in order to provide a thorough understanding of the present invention. It will be apparent to one skilled in the art, however, that the techniques described herein may be practiced without some of these specific details. In other instances, well-known structures and devices may be shown in block diagram form to avoid obscuring the underlying principles of the invention.

The embodiments described herein relate to an improved system and method for integrating zoom, pan and select functions for a user input device. The described novel pattern describes relying on user input device actions and a context menu to integrate multiple functions for a user input device. The novel techniques described herein reduce significantly the user actions required for the user input device to perform zoom, select, and pan functions. The zoom and select functions can be toggled between using the context menu provided upon selection of a selected area in the graphical display. And pan function can be performed at any time by using a drag operation of the user input device. In such embodiments, the drag operation is being used for panning within the graphical display instead of used for making an area selection as is done using conventional techniques. The zoom and select functions are therefore enabled using the context menu and the pan function is enabled anytime using a drag operation. This makes the systems and methods described herein an ideal choice applicable to many different data processing device types and sizes where users need to view and manipulate large amounts of data, such as in applications where the display of such data extends beyond the graphical display screen of the user's particular data processing device.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are in communication through one or more wire-based or wireless networks.

FIG. 1 depicts an example graphical display having a canvas area and an application area. The novel techniques described herein for integrating zoom and select functions for a user input device can be applied to any part of a graphical display screen or the full screen to enable users to start or end a selection of objects. In one embodiment, the display screen may have an application area surrounding a canvas area as shown in the figure. In other embodiments, the entire display screen may be a canvas for selecting objects according to the techniques described herein—an application area is helpful, but not needed.

FIG. 2 depicts an example function menu listing functions to be implemented with the embodiments described herein. Function menu 200 includes a representation of user input device functions and movements, the corresponding mouse or touch screen event, and the corresponding function(s) performed. The functions and mouse movements listed in function menu 200 are used herein to facilitate describing the various novel user input device techniques described herein. As used herein, the term "click" refers to actuating a user input device such as pressing a mouse button, touching a touch screen, etc.

In the illustrated embodiment, function menu 200 includes a representation of (1) a mouse up/touchend event 205, (2) a mouse down/touchstart event 206, (3) a mouse/touch movement event 207, (4) a click event 208, (5) a drag event 209, and (6) a double-click event 210. The click event 208 is associated with start/end selection functions, the drag event 209 is associated with pan functions, and the double-click event 210 is associated with a select all function. The drag operation 209 can be performed by clicking and holding down the mouse button (or maintaining the finger down position in a touch screen) and moving the mouse/user finger around to pan the viewable area of a graphical display. In one embodiment, the mouse click events correspond to a left-click, but other mouse buttons may be used—the embodiments are not limited to utilizing any particular mouse button or actuating mechanism.

Figure 3:
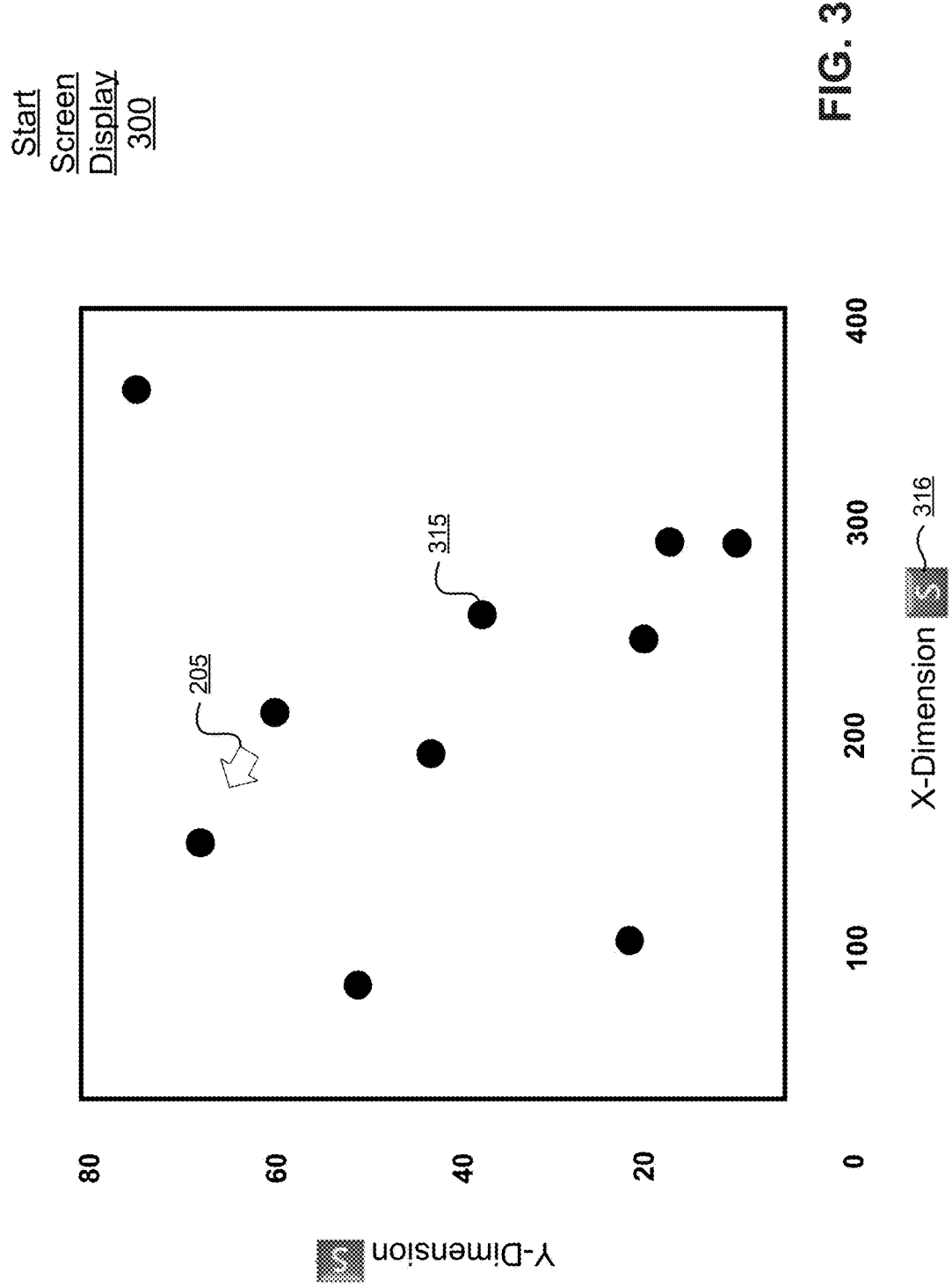
FIG. 3 depicts an example representation of a start screen containing a plurality of objects in a graphical display according to the techniques described herein.

The following description and accompanying figures illustrate examples of how the novel user input device pattern works for performing zooming, panning, and selecting objects in a graphical display. FIG. 3 depicts an example representation of a start screen containing a plurality of objects in a graphical display according to the techniques described herein. In the illustrated embodiment, start screen 300 of the graphical display includes an x-dimension (0 to 400 coordinates) and a y-dimension (0 to 80 coordinates). Other x-y dimensions are possible as this is only one example. Each of the x-y dimensions includes a snap-to-grid button 316 for use in constraining selection to a particular grid, which can be configurable based on user settings and the size of the graphical display, etc. Start screen 300 further includes a plurality of objects 315. These objects 315 can represent any type of object for selection in a graphical display.

As shown in FIG. 3, the representation of a starting position for the user input device is in the mouse up/touchend position 205. FIG. 4 depicts an example representation of starting an area selection in a graphical display according to the techniques described herein. In this embodiment, start selection display screen 400 includes a plurality of selectable objects 415. To start an area selection a first click 208 is performed by the user input device at a first location in the graphical display 400. As shown, the location corresponds to x-y coordinates (185, 63) as shown in the numeric range indicators 420 and 422. In one embodiment, the screen can change color or shading (darker in this case) to highlight selected areas on the graphical display.

Figure 5A:
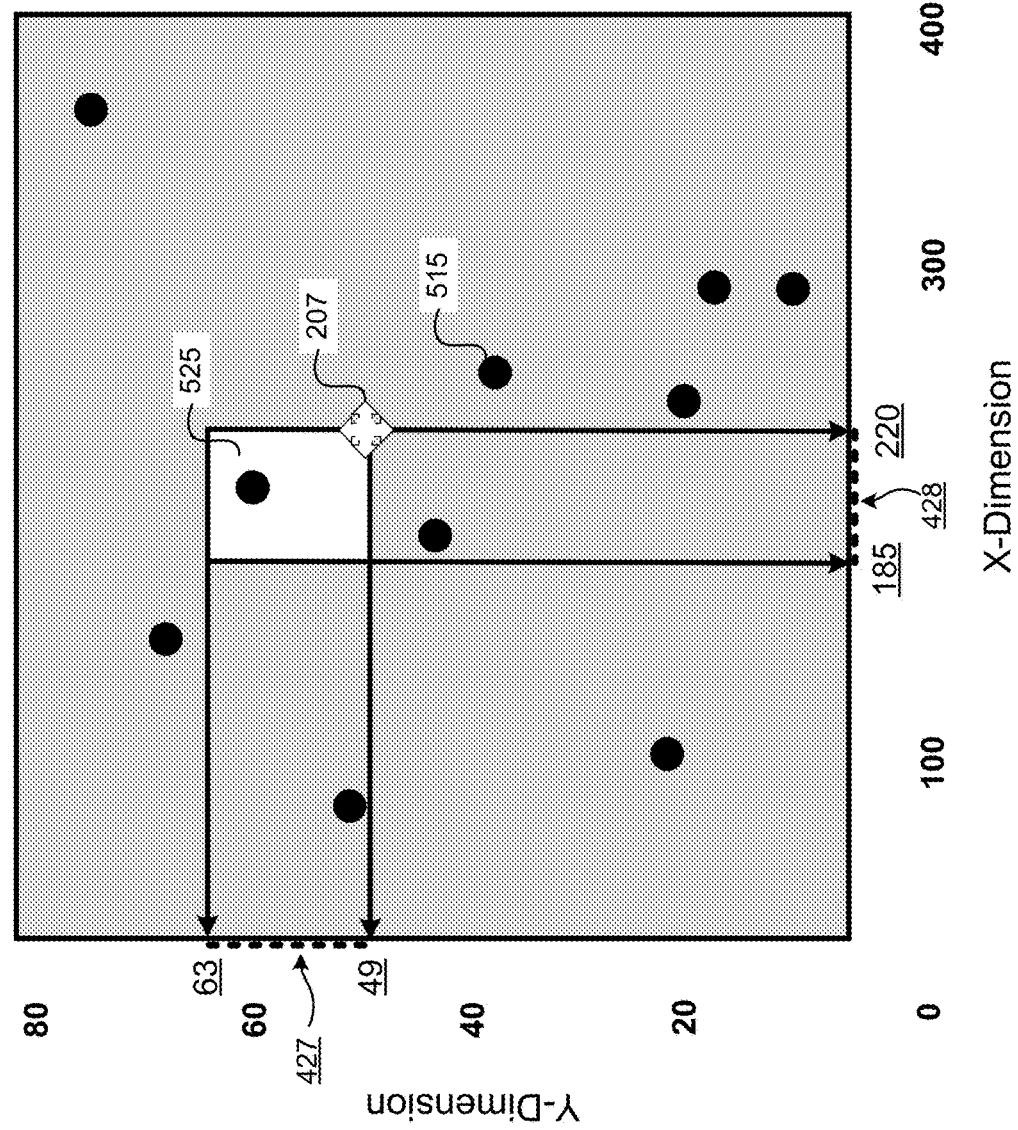
FIG. 5A depicts an example representation of user input device movement to define a selected area in a graphical display according to the techniques described herein.

The user input device can then be moved to a second location to select an area of the graphical display. FIG. 5A depicts an example representation of user input device movement to define a selected area in a graphical display according to the techniques described herein. In the illustrated embodiment, area select display screen 500A includes a plurality of selectable objects 515. As shown, the user input device performs a mouse move/touch move event 207 to move from the first location in the graphical display (185, 63) to a second location (220, 49). This user input device movement 207 defines a selectable area 525. Notably, the user input device does not need to be held in the mouse down/touch start position 206 to define the selectable area as is done in conventional techniques that require a click-and-drag operation to be performed by the user input device to select an area. That is, the area select function can be performed without having to click and drag the user input device from the first location to the second location to select the selected area in the graphical display.

As shown, the selectable area 525 can be highlighted to assist users in defining a selected area. Area select display screen 400 can also display graphic range indicators 427 and 428 to further assist users in defining the selected area.

Figure 5B:
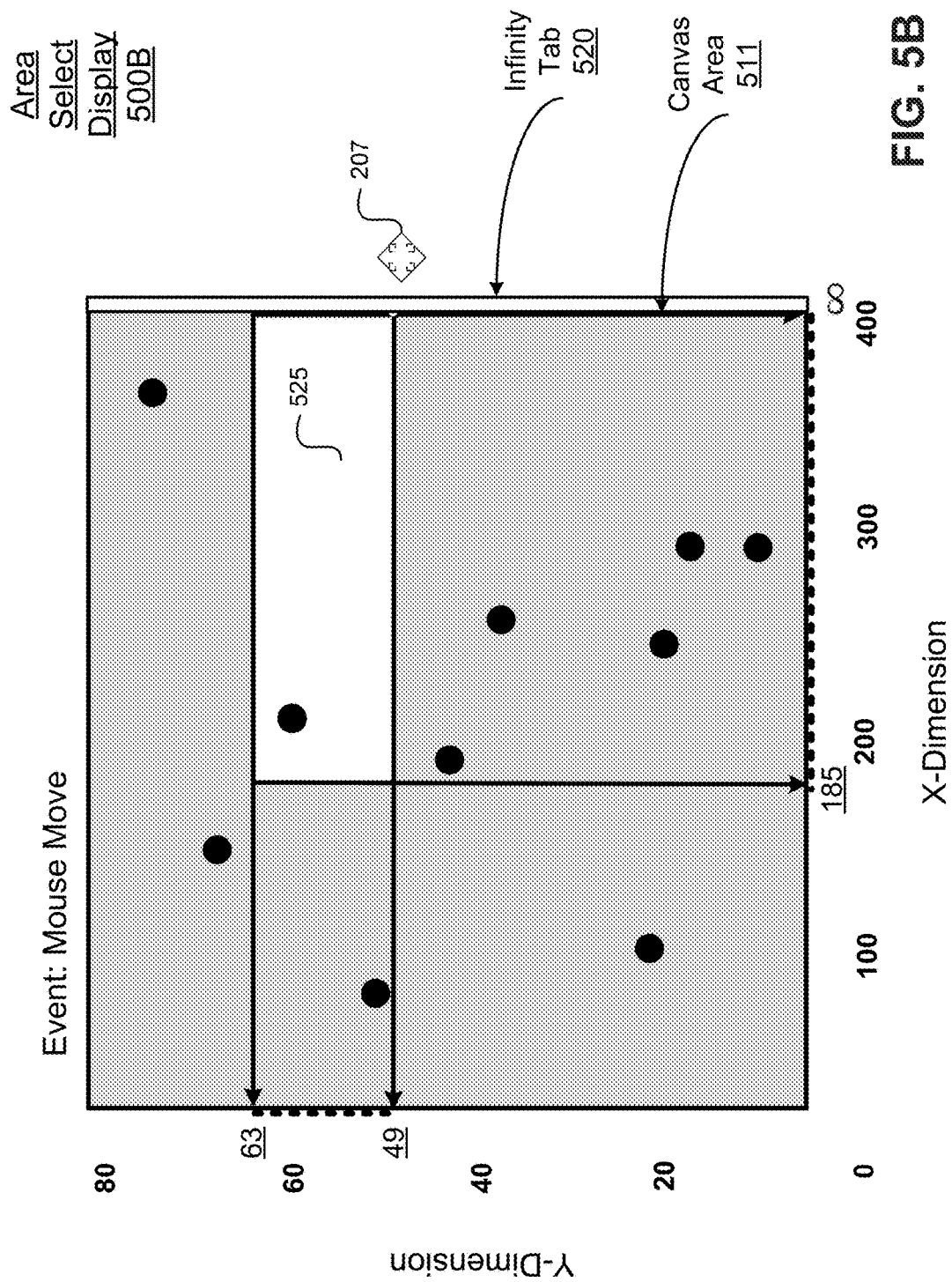
FIG. 5B depicts an alternate example representation of user input device movement to define a selected area in a graphical display according to the techniques described herein.

FIG. 5B depicts an alternate example representation of user input device movement to define a selected area in a graphical display according to the techniques described herein. In this illustrated embodiment, the user input device performs a mouse move/touch move operation 207, but in this case the user input device goes off screen (e.g., off the canvas area 511). In such a case, the selectable area 525 is defined by the edge of the area select display screen 500B defined with a range in the x-axis to a maximum range (or infinity) where the user input device went off screen. An infinity tab 520 can also be optionally provided to define the range of the selectable area to its maximum by clicking on the infinity tab. Area select display screen 500B further includes the range indicators and the x-y coordinates defining the selectable area in the graphical display.

Figure 6:
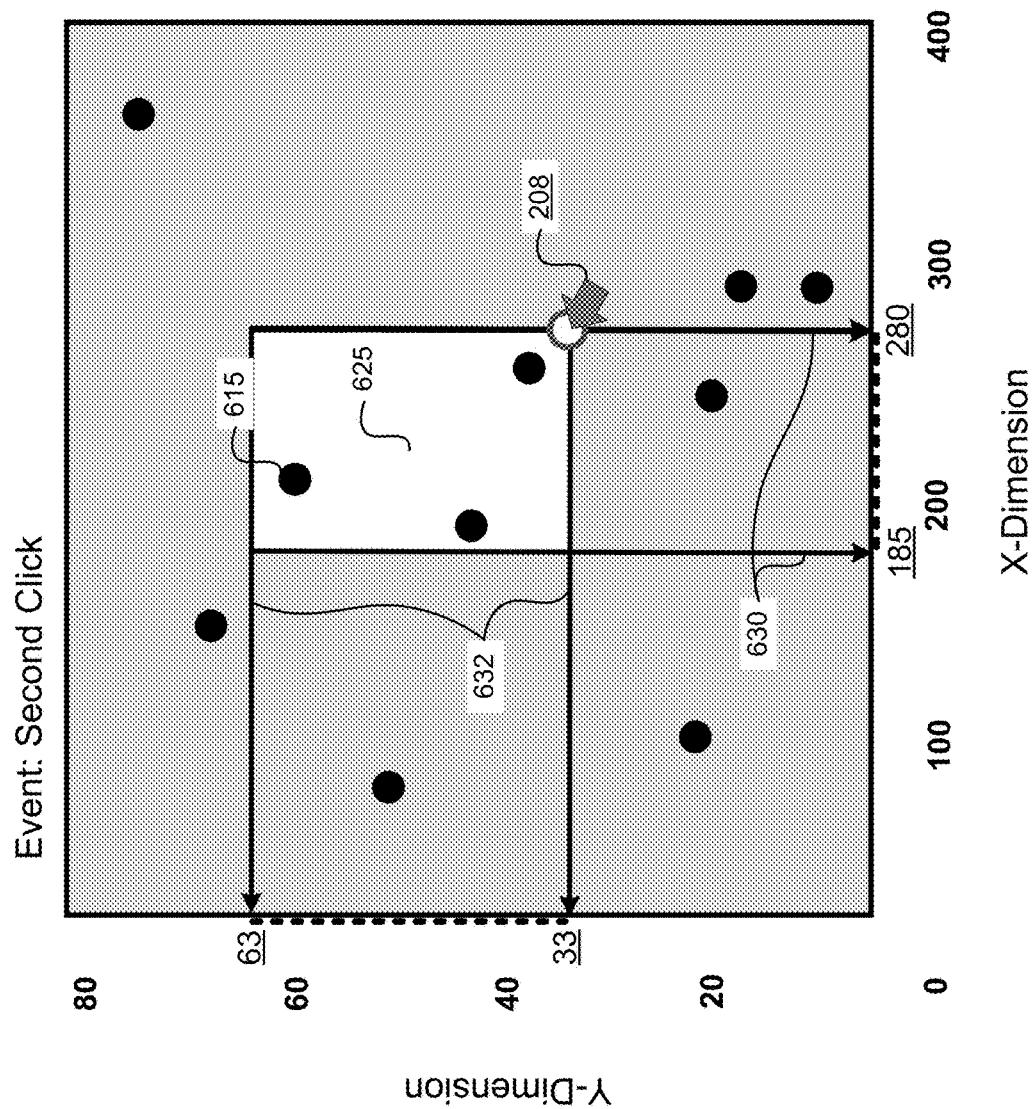
FIG. 6 depicts an example representation of finishing an area selection in a graphical display according to the techniques described herein.

FIG. 6 depicts an example representation of finishing an area selection in a graphical display according to the techniques described herein. In the illustrated embodiment, finish select display screen 600 includes a selected area 625 defined by x-coordinates (185, 200) and y-coordinates (33, 63). The area is selected by performing a second click operation 208 with the user input device at a second location to select objects 615 within the selected area 625 defined by the first location corresponding to the first click operation 208 and the second location corresponding to the second click operation 208.

As shown, finish select display screen 600 includes range indicators defining the selected area. Additionally, sliders 630 and 632 can be provided and displayed as shown in the figure. Sliders 630 and 632 can be used to further define the selected area 625 once a selection has been made. In one embodiment, the user input device can click on the sliders 630 and 632 and drag them to fine-tune the selected range of the selected area 625. Numerical values can also be entered instead of using the sliders 630 and 632 to further fine-tune the selected area.

Figure 7:
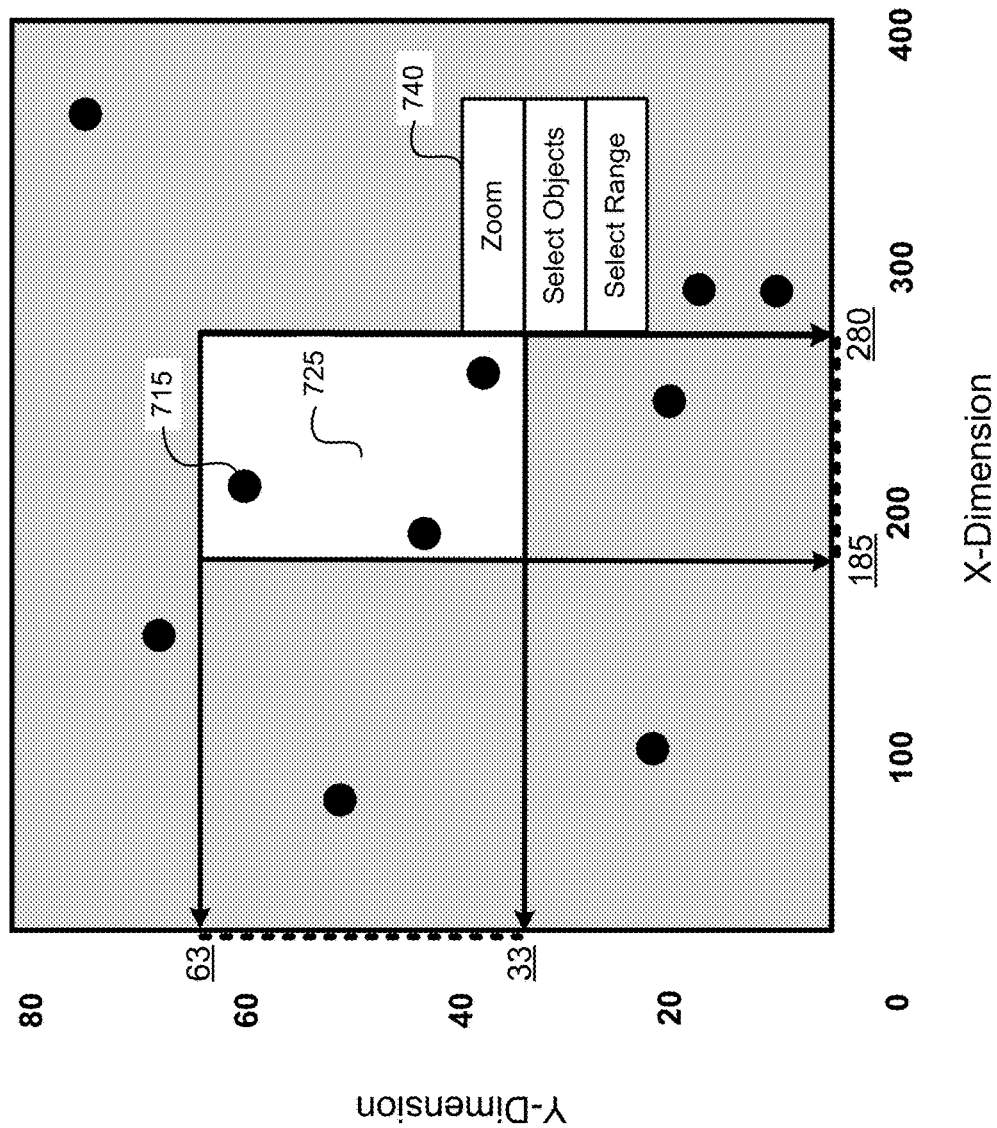
FIG. 7 depicts an example display of a context menu after a selection has been made in a graphical display according to the techniques described herein.

FIG. 7 depicts an example display of a context menu after a selection has been made in a graphical display according to the techniques described herein. In the illustrated embodiment, once the second click operation 208 is performed to define the selected area 725 containing a plurality of selectable objects 715, a context menu 740 can be displayed. In one embodiment, the context menu 740 can be displayed contemporaneously (e.g., at or near the time) with the second click operation 208 of the user input device.

The context menu 740 can display selectable events to be performed with respect to the selected area 725. As shown, the selectable events can include a zoom function selection option, a select objects function selection option, and a select range function selection option. In other embodiments, additional actions for the user input device may be provided and displayed in the context menu 740. The particular contents of the context menu 740 can vary depending on the particular data processing system and software program being used, and on one or more user-configurable settings.

A third click operation 208 can be received from the user input device to select one of the options from the context menu 740. Once the user input device performs a third click operation 208 within the context menu 740 to select one of the listed functions, the function can be performed. The selected function can be performed without requiring any additional mouse/touch screen movements or events such as selecting any additional buttons, menus, tabs, etc. to trigger the desired functionality.

Thus with three clicks and one movement of the user input device, an area within the graphical interface can be selected and a function can be performed (e.g., zoom or select) with respect to the selected area. This contrasts sharply with conventional methods which typically require (1) a click-and-drag to define the selectable area, (2) a second click to select the area, (3) an additional movement to a third location where the function to be selected is located (e.g., menu, button, tool bar, tab, etc.), and (4) a third click to select the desired function.

Figure 8:
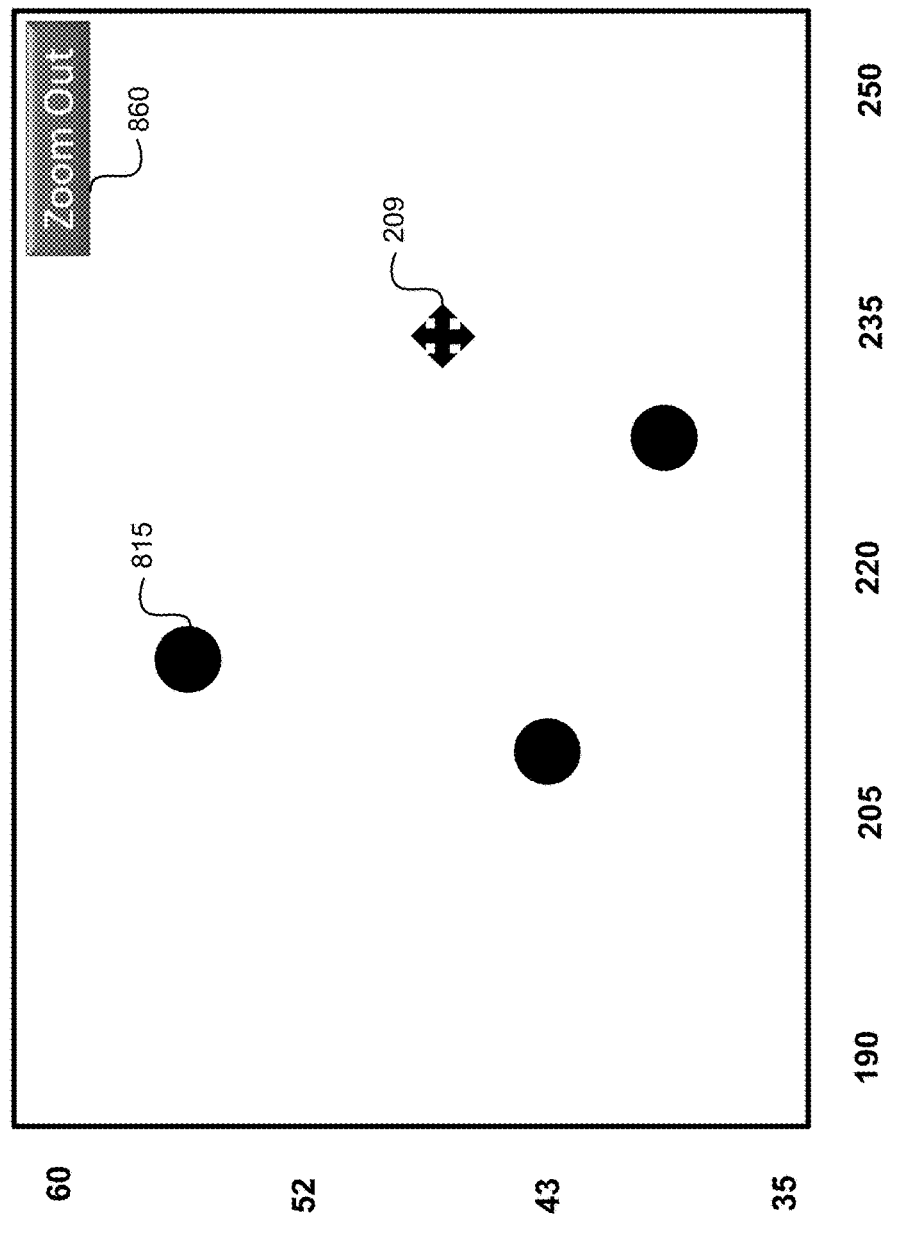
FIG. 8 depicts an example representation of a zoomed-in view in a graphical display according to the techniques described herein.

FIG. 8 depicts an example representation of a zoomed-in view in a graphical display according to the techniques described herein. The zoomed view display screen 800 corresponds to the selected area 725 from the previous display screen 700 of FIG. 7. As shown, the zoomed view display screen 800 includes a plurality of selectable objects 815 within the zoomed-in view of the selected area 725. Zoomed view display screen further includes a zoom out button 860 that can be used to return the display screen to the previous view 700.

In the illustrated embodiment, the user input device is shown performing a drag operation 209. A pan function can be triggered with the drag operation 209 to move around the display screen 800. The pan function can also be provided in the zoomed out view of display screen 700 of FIG. 7. In this manner, the pan functionality can be incorporated into the functions of the user input device with a simple click-and-drag operation 207 without having to make additional movements to a different location in the display to select a button, tab, toolbar, menu, or other selection mechanism to trigger the pan function. Thus the embodiments described herein are configured to integrate the pan function without having to invoke additional mechanisms or user input device movements.

FIG. 9A depicts an example representation of selected objects in a graphical display according to the techniques described herein. Objects selected display screen 910A is a zoomed-out view of the previous display screen 800 of FIG. 8. In this case, the user input device selected the "select objects" selection option from the context menu 740 shown in FIG. 7. Accordingly the objects 865 within the selected area 725 of previous display screen 700 are shown as selected in the graphical display 901A.

Figure 9B:
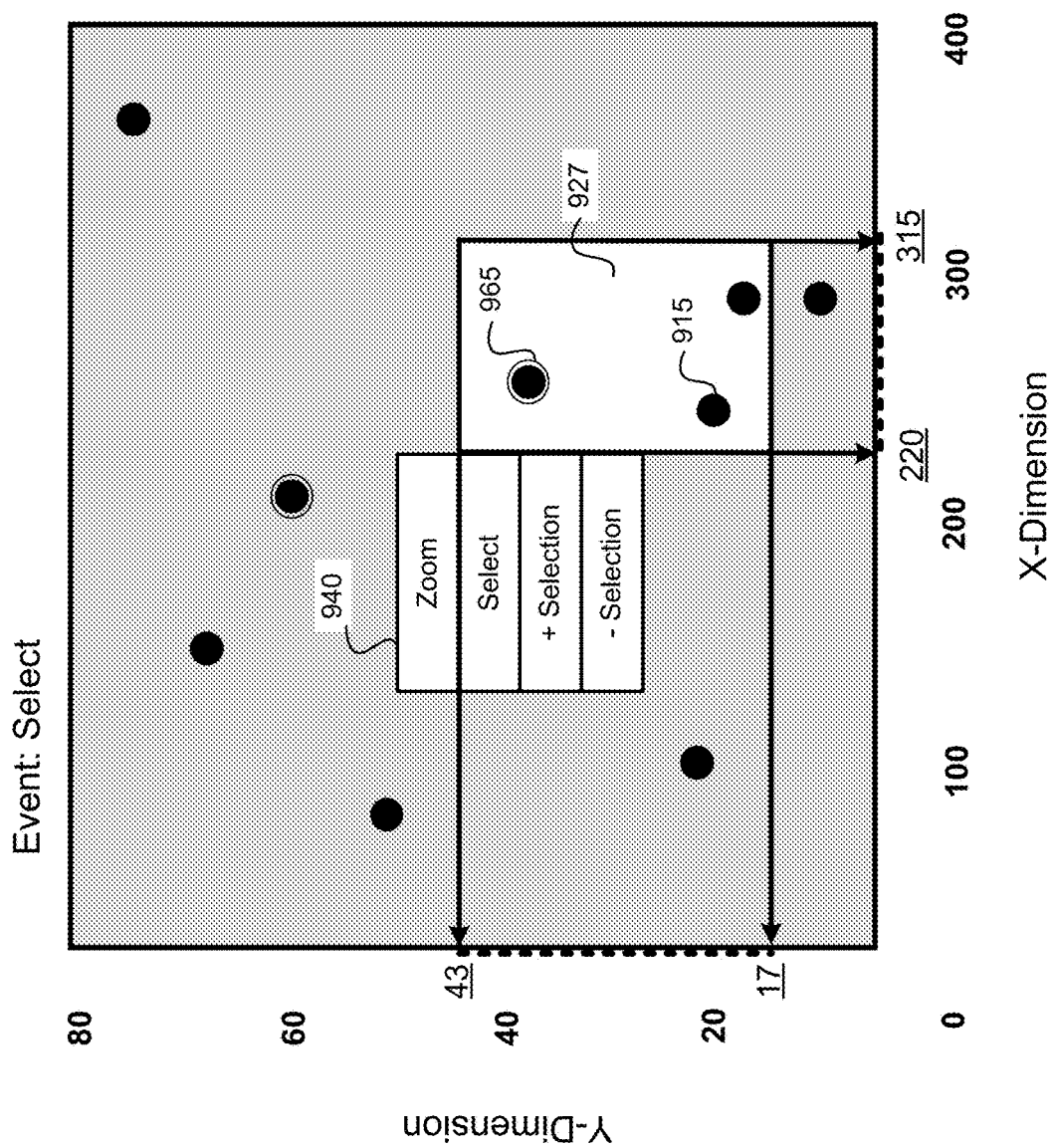
FIG. 9B depicts an example representation of a selection of additional objects in a graphical display according to the techniques described herein.

FIG. 9B depicts an example representation of a selection of additional objects in a graphical display according to the techniques described herein. In the illustrated embodiment, add/remove objects display screen 900B shows the user input device having the option to make additional object selections. The user input device can define a second selected area 927 as described above with respect to the mouse/touch screen device movements that were used previously for selecting the first selected area 725 of FIG. 7, while the first selected objects (e.g., 965) in the first selected area 725 remain selected. The second selected area 927 can include additional selectable objects 915 in the graphical display. In the figure, the second selected area corresponds to (200, 315) in the x-dimension and (17, 43) in the y-dimension.

Once the second area 927 is selected, a context menu 940 can be displayed (in one embodiment, contemporaneously with selecting the second area). In this case, since there are already selected objects 965 from the first selection of the first set of objects in the first selected area 725, the context menu 940 can additionally include a "+ selection" (add to selection) option for adding objects 915 to the selection and "– selection" (remove from selection) option for removing objects 965 from the original selection. In one embodiment, the + selection and – selection are only displayed when there are objects that have already been previously selected.

The user input device can also zoom into the second selected area 927 to make additional object selections, etc. based on selecting the zoom function selection option in the context menu 940. The context menu can also contain additional entries like "delete" or "group" for selection.

In addition, the context menu may be supplied with anchor points (not shown). An anchor point is the position of the second click that selects the selected area. The process for implementing this pattern tries to use an anchor point by trying several anchor points out in a particular user-configurable order. The first anchor point where the menu can fit within the display screen without obstructing the selection area is the one that will be used. If it is not possible to avoid obstructing the selection area, the anchor points are again tried out in the same order within the selection area.

Figure 9C:
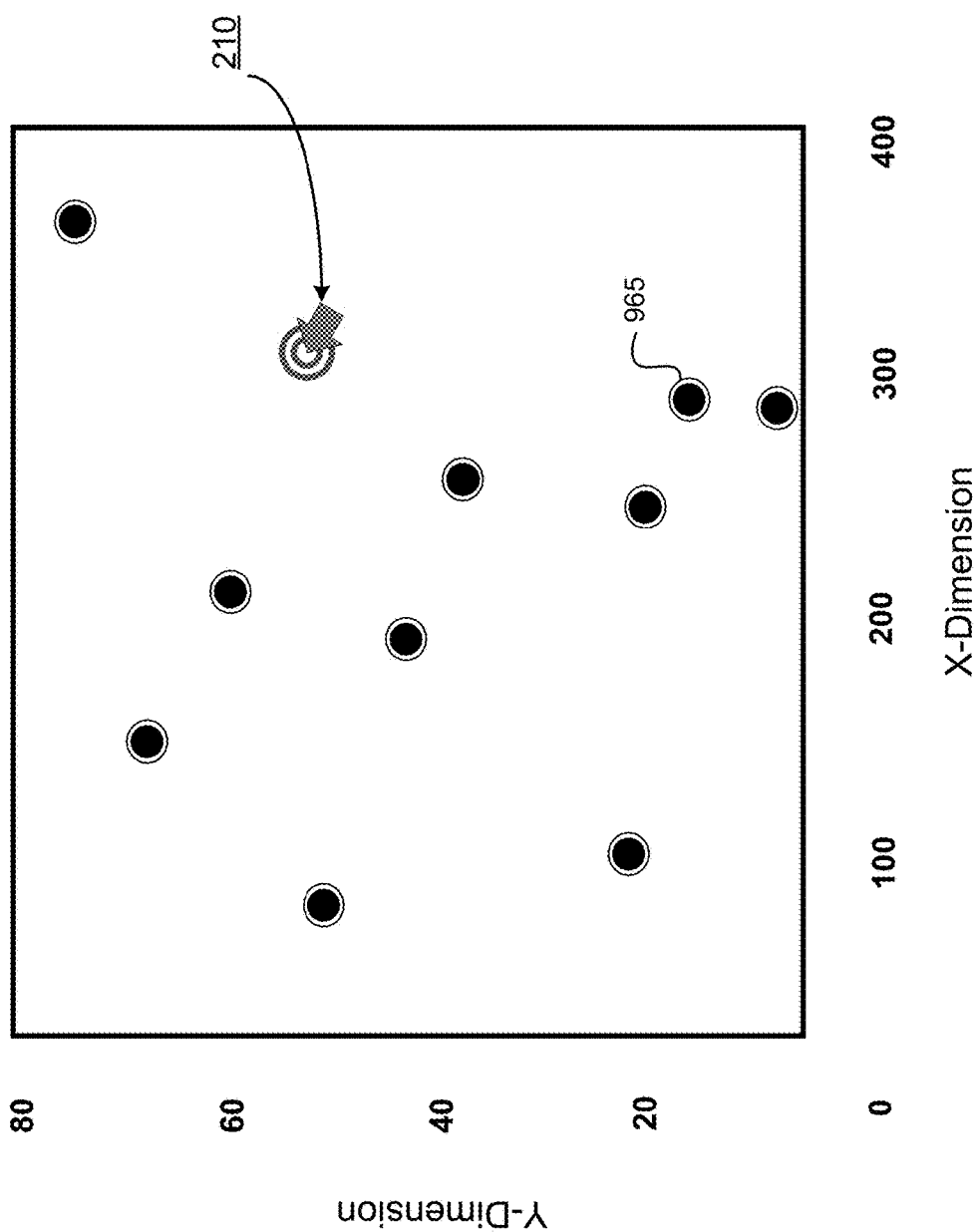
FIG. 9C depicts an example representation of selecting all objects in a graphical display according to the techniques described herein.

FIG. 9C depicts an example representation of selecting all objects in a graphical display according to the techniques described herein. In the illustrated embodiment, the user input device performs a double-click operation 210, which is configured to select all the objects 965 on the display screen 900C.

II. Exemplary Processes

Figure 10A:
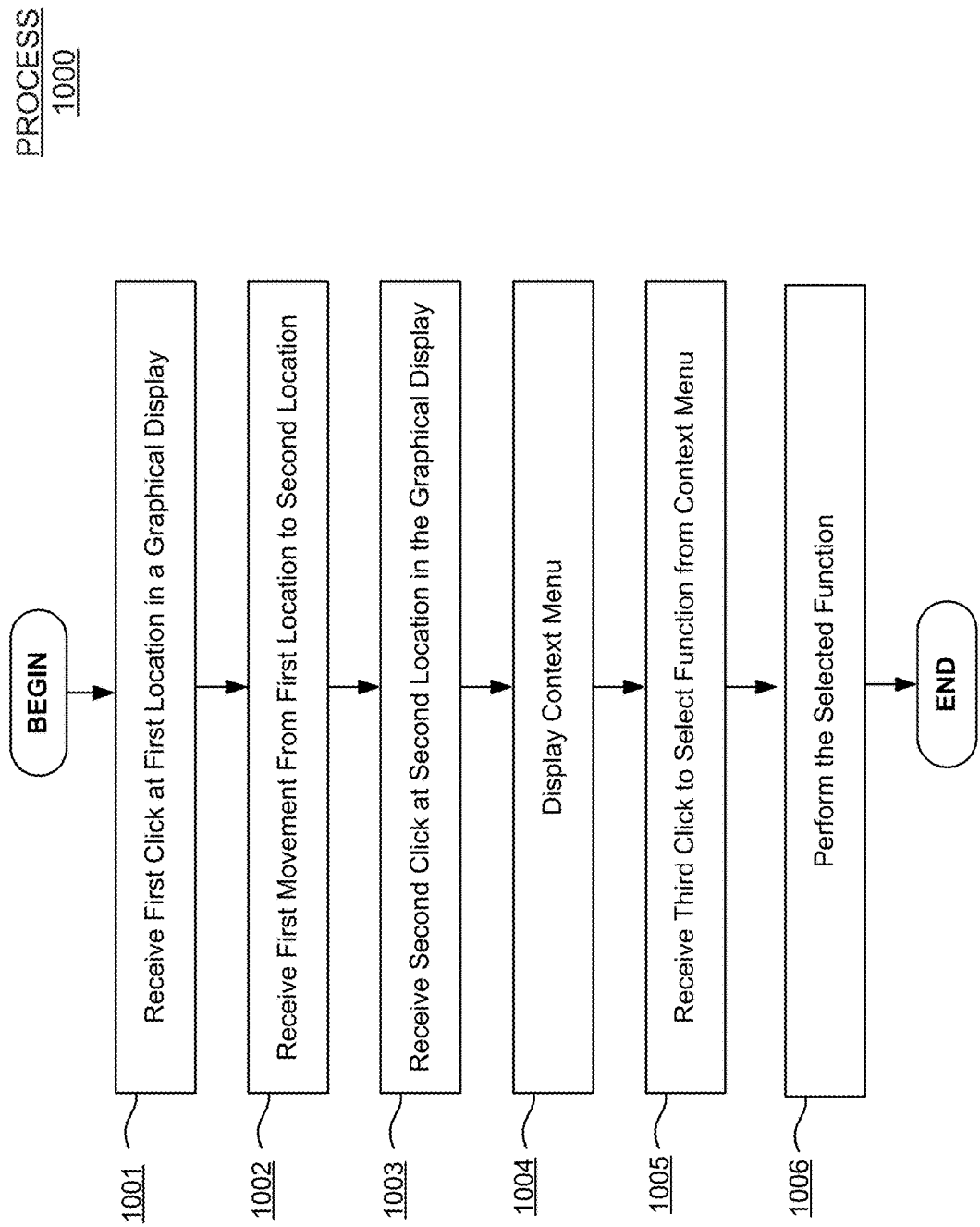
Figure 10B:
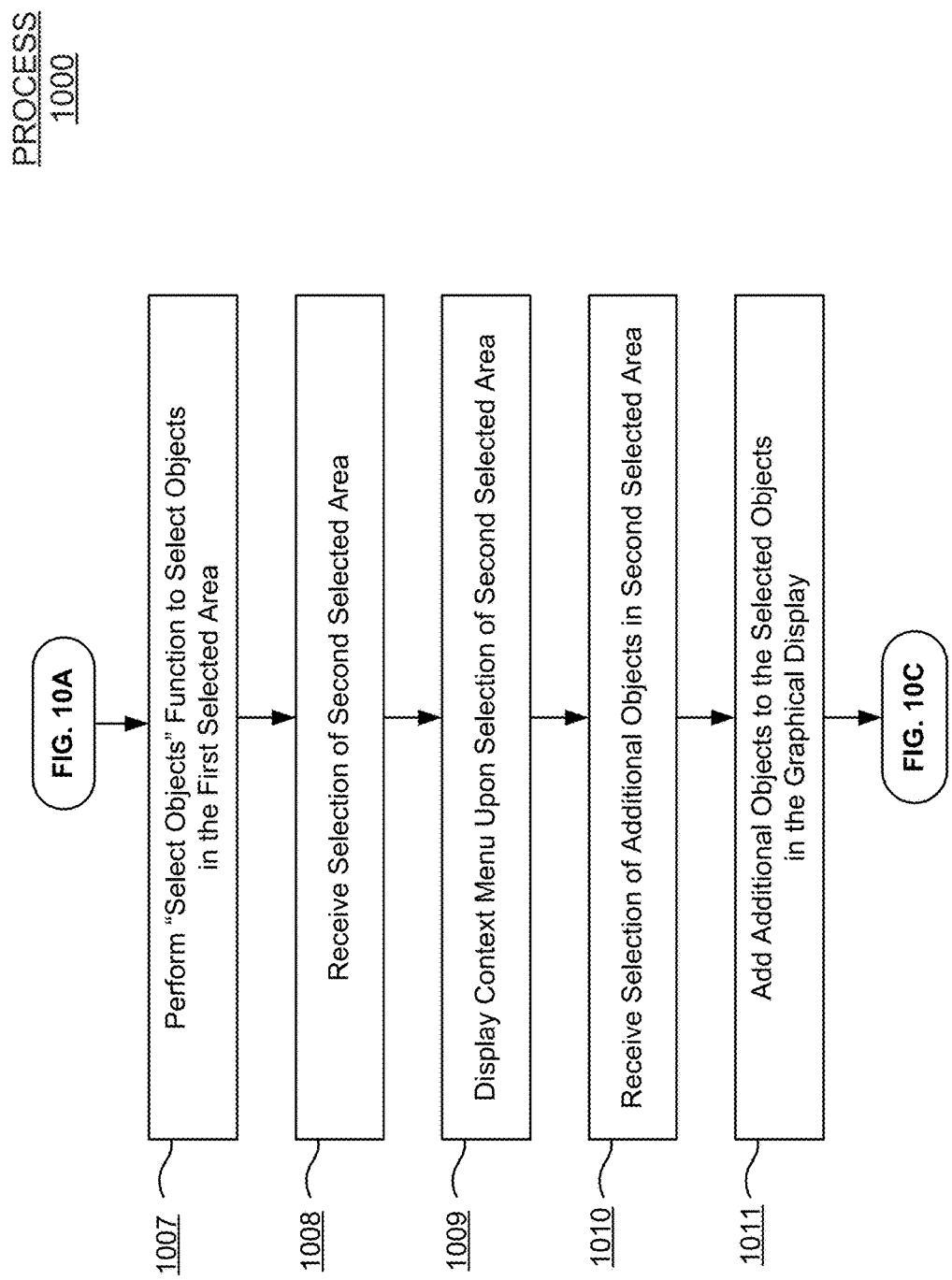

FIGS. 10A-10C depict example flow charts of embodiments of a process for integrating zoom, pan and select functions for a user input device according to the techniques described herein. It is noted that the processes described below are exemplary in nature and are provided for illustrative purposes and not intended to limit the scope of the invention to any particular example embodiment. For instance, the process in accordance with some embodiments described herein may include or omit some or all of the operations described below, or may include operations in a different order than described herein. The particular processes described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

FIG. 10A depicts an example flow chart of an embodiment of a process for integrating zoom, pan and select functions for a user input device according to the techniques described herein. In the illustrated embodiment, process 1000 begins at operation 1001 by receiving an indication of a first click from the user input device at a first location in a graphical display (operation 1001). The process 1000 can then optionally receive an indication of a first movement from the first location to a second location in the graphical display after the first click (operation 1002). The first location and the second location define a selected area in the graphical display. In the touch screen case, the first movement between the first location and the second location is accomplished without having to receive an indication of the first movement since a touch screen device works by detecting the first location and the second location based on user touch.

Process 1000 continues by receiving an indication of a second click from the user input device at the second location to select the selected area (operation 1003) and displaying a context menu in the graphical display upon selection of the selected area (operation 1004). The context menu can include at least a zoom function selection option and a select function selection option. In other embodiments, additional function selection options may be displayed in the context menu.

Process 100 continues by receiving in the context menu an indication of a third click from the user input device that selects one of the functions, e.g., the zoom function or the select function (operation 1005) and performing the selected function (e.g., zoom function or select function) upon receiving the third click (operation 1006). The select function is operable to select individual objects or a range of objects within the selected area of the graphical display. The zoom function is operable to zoom into the selected area of the graphical display.

The zoom function and the select function are provided in a single context menu. Thus a single user input device operation is operable to toggle between the zoom and select functions. The select function can be performed without having to click and drag the user input device to select the selected area. In one embodiment, the context menu can be displayed contemporaneously upon receiving the indication of the second click from the user input device.

In addition, the pan function is provided for the user input device. Upon receiving an indication of a drag operation from the user input device, the process is operable to perform a pan function within the graphical display in response to the drag operation.

Process 1000 continues on FIG. 10B, which depicts an example flowchart of an embodiment of a process for integrating functions for a user input device. Process 1000 continues by performing the select function to select objects in the selected area in response to receiving selection of the select function in the context menu (operation 1007), receiving a selection of a second selected area in the graphical display from the user input device (operation 1008), and displaying the context menu in the graphical display upon receiving the selection of the second selected area (operation 1009).

Process 1000 continues by receiving in the context menu a selection of the select function to select additional objects in the second selected area (operation 1010) and adding the additional selected objects to the selected objects in the graphical display (operation 1011). This process can also be used to remove selected objects from the second selected area.

Process 1000 continues on FIG. 10C, which depicts an example flowchart of an embodiment of a process for integrating functions for a user input device. Process 1000 continues by performing the zoom function to zoom into the selected area in response to receiving selection of the zoom function in the context menu (operation 1012), receiving a selection of a second selected area from the user input device in the zoomed-in graphical display (operation 1013), displaying the context menu upon receiving the selection of the second selected area (operation 1014), receiving in the context menu a selection of the zoom function (operation 1015), and performing the zoom function to further zoom into the second selected area within the selected area of the graphical display (operation 1016). This completes process 1000 according to one example embodiment.

III. Advantages

The advantages of the techniques described herein are numerous. First, the embodiments provide for two-click area selection without having to perform a click-and-drag operation. Further, the embodiments provide for zoom and select functions within a single context menu. Moreover, the pan function is integrated using the click-and-drag feature that is no longer required to be used for area selection purposes. Also the selected function can be performed without requiring any additional mouse/touch screen movements or actions such as selecting any additional buttons, menus, tool bars, tabs, etc. to trigger the desired selection functionality.

IV. Exemplary Hardware Implementation

Embodiments of the present invention may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

Figure 11:
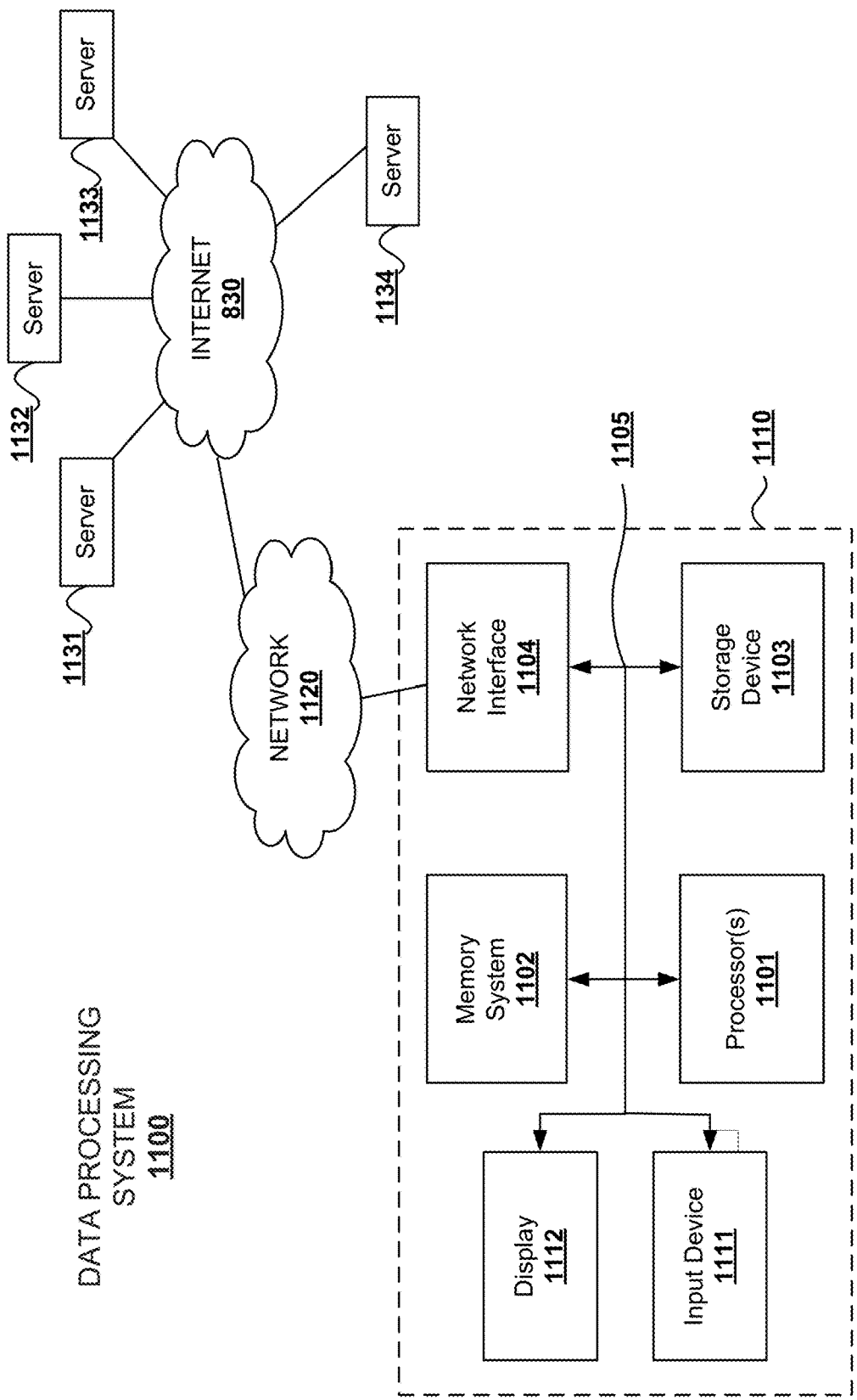
FIG. 11 depicts an overview block diagram of an example data processing system upon which the embodiments described herein may be implemented.

FIG. 11 depicts an overview block diagram of an example data processing system upon which the embodiments described herein may be implemented. The following hardware description is merely one example. It is to be understood that a variety of computers configurations may be used to implement the described techniques. While FIG. 11 illustrates various components of a data processing system 1100, it is not intended to represent any particular architecture or manner of interconnecting components. It will also be appreciated that network computers and other data processing systems, which have fewer components or additional components, may be used. The data processing system 1100 may, for example, comprise a personal computer, workstation, laptop computer, tablet, smartphone or other hand-held wireless device, or any device having similar functionality.

In the illustrated embodiment, data processing system 1100 includes a computer system 1110. Computer system 1110 includes an interconnect bus 1105 (or other communication mechanism for communicating information) and one or more processor(s) 1101 coupled with the interconnect bus 1105 for processing information. Computer system 1110 also includes a memory system 1102 coupled with the one or more processors 1101 via the interconnect bus 1105. Memory system 1102 is configured to store information and instructions to be executed by processor 1101, including information and instructions for performing the techniques described above. This memory system may also be used for storing programs executed by processor(s) 1101. Possible implementations of this memory system may be, but are not limited to, random access memory (RAM), read only memory (ROM), or combination thereof.

In the illustrated embodiment, a storage device 1103 is also provided for storing information and instructions. Typically storage device 1103 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 1103 may store source code, binary code, or software files for performing the techniques above. In addition, while FIG. 11 shows that storage device 1103 as a local device connected with the components of the data processing system, it will be appreciated by skilled artisans that the described techniques may use a storage device remote from the system, such as a database or other network storage device coupled with the computer system 1110 through a network interface such as network interface 1104.

Network interface 1104 may provide communications between computer system 1110 and a network 1120. The network interface 1104 may be a wireless or wired connection, or any combination thereof. Computer system 1110 is configured to send and receive information through the network interface 1104 across one or more networks 1120 such as a local area network (LAN), wide-area network (WAN), wireless or Bluetooth network, or the Internet 1130, etc. Computer system 1110 may access data and features on systems residing on one or multiple different hardware servers 1131-1134 across the network 1120. Hardware servers 1131-1134 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein.

Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 1110 may be coupled via interconnect bus 1105 to a display 1112 for displaying information to a computer user. An input device 1111 such as a keyboard, touchscreen, and/or mouse is coupled to bus 1105 for communicating information and command selections from the user to processor 1101. The combination of these components allows the user to communicate with the system. In some systems, bus 1105 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the invention. It will be apparent, however, to persons skilled in the art that these embodiments may be practiced without some of these specific details. The above examples and embodiments should not be deemed to be the only embodiments, and are presented to illustrate the flexibility and advantages of the present invention. Other arrangements, embodiments, implementations and equivalents will be evident to those skilled in the art and may be employed without departing from the spirit and scope of the invention as defined by the following claims.

What is claimed is:

1. A method for integrating zoom and select functions for a user input device comprising: receiving an indication of a start of a first click from the user input device at a first location in a graphical display configured for displaying a set of objects; receiving an indication of an end of the first click from the user input device at the first location in the graphical display; after receiving the indication of the end of the first click, receiving an indication of a start of a second click from the user input device at a second location in the graphical display; receiving an indication of an end of the second click from the user input device at the second location in the graphical display, wherein receiving the indication of the end of the second click causes selection of an area in the graphical display defined by the first location and the second location; displaying a graphical representation of the selected area in the graphical display; providing a first set of sliders along a first axis of the graphical display for adjusting the selected area along the first axis; providing a second set of sliders along a second axis of the graphical display for adjusting the selected area along the second axis, wherein the first axis is perpendicular to the second axis; displaying a first range indicator comprising a first line formed between the first set of sliders along the first axis of the graphical display; displaying a second range indicator comprising a second line formed between the second set of sliders along the second axis of the graphical display; receiving an indication of a drag operation from the user input device on a slider in one of the first and second sets of sliders; in response to receiving the indication of the drag operation, adjusting the selected area along one of the first and second axes that is associated with the slider; displaying a context menu in the graphical display without obstructing the selected area, wherein the context menu comprises a selectable zoom function that, when selected, displays a zoomed-in view of the selected area in the graphical display and a selectable select function that, when selected, selects objects in the set of objects encompassed by the selected area; receiving in the context menu an indication of a third click from the user input device that selects the selectable zoom function or the selectable select function; and performing the selected zoom function or select function upon receiving the third click, wherein the selected area is defined based on the first location and the second location without a drag operation having to be performed by the user input device to select the selected area.

2. The method of claim 1 further comprising:
after receiving the indication of the end of the first click and before receiving the indication of the start of the second click, receiving an indication of a move input from the first location to the second location, wherein the move input defines a selectable area between the first location and the second location.

3. The method of claim 1, wherein the selectable zoom function and the selectable select function are provided in a single context menu.

4. The method of claim 1, wherein the context menu is displayed contemporaneously upon receiving the indication of the second click.

5. The method of claim 1, wherein the selected area is a first selected area, wherein the context menu is a first context menu, wherein the selectable zoom function is a first selectable zoom function, wherein the selectable select function is a first selectable select function, the method further comprising: performing the first selectable zoom function to display the zoomed-in view of the first selected area in the graphical display in response to receiving selection of the first selectable zoom function in the first context menu; receiving an indication of a start of a third click from the user input device at a third location in the graphical display; receiving an indication of an end of the third click from the user input device at the third location in the graphical display; after receiving the indication of the end of the third click, receiving an indication of a start of a fourth click from the user input device at a fourth location in the graphical display; receiving an indication of an end of the fourth click from the user input device at the fourth location in the graphical display, wherein receiving the indication of the end of the fourth click causes a selection of a second area in the graphical display defined by the third location and the fourth location; displaying a graphical representation of the second selected area in the graphical display from the user input device; displaying a second context menu in the graphical display, wherein the second context menu comprises a second selectable zoom function that, when selected, displays a zoomed-in view of the second selected area in the graphical display and a second selectable select function that, when selected, selects objects in the set of objects encompassed by the second selected area; receiving in the second context menu a selection of the second zoom function; and displaying the zoomed-in view of the second selected area in the graphical display.

6. A system for integrating zoom and select functions for a user input device comprising: a processor and a system memory in communication with the processor via a communication medium, the system memory configured to store computer code, which when executed by the processor, causes the processor to perform operations comprising: receiving an indication of a start of a first click from the user input device at a first location in a graphical display configured for displaying a set of objects; receiving an indication of an end of the first click from the user input device at the first location in the graphical display; after receiving the indication of the end of the first click, receiving an indication of a start of a second click from the user input device at a second location in the graphical display; receiving an indication of an end of the second click from the user input device at the second location in the graphical display, wherein receiving the indication of the end of the second click causes selection of an area in the graphical display defined by the first location and the second location; displaying a graphical representation of the selected area in the graphical display; providing a first set of sliders along a first axis of the graphical display for adjusting the selected area along the first axis; providing a second set of sliders along a second axis of the graphical display for adjusting the selected area along the second axis, wherein the first axis is perpendicular to the second axis; displaying a first range indicator comprising a first line formed between the first set of sliders along the first axis of the graphical display; displaying a second range indicator comprising a second line formed between the second set of sliders along the second axis of the graphical display; receiving an indication of a drag operation from the user input device on a slider in one of the first and second sets of sliders; in response to receiving the indication of the drag operation, adjusting the selected area along one of the first and second axes that is associated with the slider; displaying a context menu in the graphical display without obstructing the selected area, wherein the context menu comprises a selectable zoom function that, when selected, displays a zoomed-in view of the selected area in the graphical display and a selectable select function that, when selected, selects objects in the set of objects encompassed by the selected area; receiving in the context menu an indication of a third click from the user input device that selects the selectable zoom function or the selectable select function; and performing the selected zoom function or select function upon receiving the third click.

7. The system of claim 6, wherein the operations further comprise:
after receiving the indication of the end of the first click and before receiving the indication of the start of the second click, receiving an indication of a move input from the first location to the second location, wherein the move input defines a selectable area between the first location and the second location.

8. The system of claim 6, wherein the selectable zoom function and the selectable select function are provided in a single context menu.

9. The system of claim 6, wherein the context menu is displayed contemporaneously upon receiving the indication of the second click.

10. The system of claim 6, wherein the selected area is a first selected area, wherein the context menu is a first context menu, wherein the selectable zoom function is a first selectable zoom function, wherein the selectable select function is a first selectable select function, wherein the operations further comprise: performing the first selectable zoom function to display the zoomed-in view of the first selected area in the graphical display in response to receiving selection of the first selectable zoom function in the first context menu; receiving an indication of a start of a third click from the user input device at a third location in the graphical display; receiving an indication of an end of the third click from the user input device at the third location in the graphical display; after receiving the indication of the end of the third click, receiving an indication of a start of a fourth click from the user input device at a fourth location in the graphical display; receiving an indication of an end of the fourth click from the user input device at the fourth location in the graphical display, wherein receiving the indication of the end of the fourth click causes a selection of a second area in the graphical display defined by the third location and the fourth location; displaying a graphical representation of the second selected area in the graphical display from the user input device; displaying a second context menu in the graphical display, wherein the second context menu comprises a second selectable zoom function that, when selected, displays a zoomed-in view of the second selected area in the graphical display and a second selectable select function that, when selected, selects objects in the set of objects encompassed by the second selected area; receiving in the second context menu a selection of the second zoom function; and displaying the zoomed-in view of the second selected area in the graphical display.

11. A non-transitory computer readable storage medium tangibly embodying computer code, which when executed by a computer system, causes the computer system to perform operations for integrating zoom and select functions for a user input device, the operations comprising: receiving an indication of a start of a first click from the user input device at a first location in a graphical display configured for displaying a set of objects; receiving an indication of an end of the first click from the user input device at the first location in the graphical display; after receiving the indication of the end of the first click, receiving an indication of a start of a second click from the user input device at a second location in the graphical display; receiving an indication of an end of the second click from the user input device at the second location in the graphical display, wherein receiving the indication of the end of the second click causes selection of an area in the graphical display defined by the first location and the second location; displaying a graphical representation of the selected area in the graphical display; providing a first set of sliders along a first axis of the graphical display for adjusting the selected area along the first axis; providing a second set of sliders along a second axis of the graphical display for adjusting the selected area along the second axis, wherein the first axis is perpendicular to the second axis; displaying a first range indicator comprising a first line formed between the first set of sliders along the first axis of the graphical display; displaying a second range indicator comprising a second line formed between the second set of sliders along the second axis of the graphical display; receiving an indication of a drag operation from the user input device on a slider in one of the first and second sets of sliders; in response to receiving the indication of the drag operation, adjusting the selected area along one of the first and second axes that is associated with the slider; displaying a context menu in the graphical display without obstructing the selected area, wherein the context menu comprises a selectable zoom function that, when selected, displays a zoomed-in view of the selected area in the graphical display and a selectable select function that, when selected, selects objects in the set of objects encompassed by the selected area; receiving in the context menu an indication of a third click from the user input device that selects the selectable zoom function or the selectable select function; and performing the selected zoom function or select function upon receiving the third click.

12. The non-transitory computer readable storage medium of claim 11, wherein the operations further comprise: after receiving the indication of the end of the first click and before receiving the indication of the start of the second click, receiving an indication of a move input from the first location to the second location, wherein the move input defines a selectable area between the first location and the second location.

13. The non-transitory computer readable storage medium of claim 11, wherein the selectable zoom function and the selectable select function are provided in a single context menu.

14. The non-transitory computer readable storage medium of claim 11, wherein the context menu is displayed contemporaneously upon receiving the indication of the second click.

15. The non-transitory computer readable storage medium of claim 11, wherein the selected area is a first selected area, wherein the context menu is a first context menu, wherein the selectable zoom function is a first selectable zoom function, wherein the selectable select function is a first selectable select function, wherein the operations further comprise: performing the first selectable zoom function to display the zoomed-in view of the first selected area in the graphical display in response to receiving selection of the first selectable zoom function in the first context menu; receiving an indication of a start of a third click from the user input device at a third location in the graphical display; receiving an indication of an end of the third click from the user input device at the third location in the graphical display; after receiving the indication of the end of the third click, receiving an indication of a start of a fourth click from the user input device at a fourth location in the graphical display; receiving an indication of an end of the fourth click from the user input device at the fourth location in the graphical display, wherein receiving the indication of the end of the fourth click causes a selection of a second area in the graphical display defined by the third location and the fourth location; displaying a graphical representation of the second selected area in the graphical display from the user input device; displaying a second context menu in the graphical display, wherein the second context menu comprises a second selectable zoom function that, when selected, displays a zoomed-in view of the second selected area in the graphical display and a second selectable select function that, when selected, selects objects in the set of objects encompassed by the second selected area; receiving in the second context menu a selection of the second zoom function; and displaying the zoomed-in view of the second selected area in the graphical display.

* * * * *